(12) United States Patent
Miyagawa

(10) Patent No.: US 9,036,224 B2
(45) Date of Patent: May 19, 2015

(54) IMAGE READING DEVICE AND IMAGE FORMING APPARATUS

(71) Applicant: KYOCERA Document Solutions Inc., Osaka-shi, Osaka (JP)

(72) Inventor: Seiji Miyagawa, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/169,769

(22) Filed: Jan. 31, 2014

(65) Prior Publication Data
US 2014/0211278 A1    Jul. 31, 2014

(30) Foreign Application Priority Data
Jan. 31, 2013    (JP) .................................. 2013-016588

(51) Int. Cl.
*H04N 1/04*    (2006.01)
*H04N 1/00*    (2006.01)
*H04N 1/10*    (2006.01)

(52) U.S. Cl.
CPC ......... *H04N 1/00588* (2013.01); *H04N 1/1008* (2013.01)

(58) Field of Classification Search
CPC .................. H04N 1/00588; H04N 1/1008
USPC .................. 358/496, 497, 498, 474
See application file for complete search history.

(56) References Cited

U.S. PATENT DOCUMENTS
2010/0073704 A1*  3/2010  Naruse .................. 358/1.14

FOREIGN PATENT DOCUMENTS
JP    5-330692    12/1993
JP    05-330692   * 12/1993  ............... B65H 7/06

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

In an image reading device, an interlock portion is configured to supply or cut off power supply voltage to a driving portion in association with opening/closing of a cover. An open/close detecting portion is configured to detect opening/closing of the cover. A control portion is configured to execute (a) a scan process of causing a reading portion to read a document image during movement of the reading portion from a first position to a second position, (b) a return process of returning the reading portion to the first position in the opposite direction, (c) a reading interruption process of stopping a scan process when an opened state of the cover is detected during the scan process, and executing a return process when a closed state of the cover is detected next time, and (d) the scan process again after the reading interruption process.

6 Claims, 7 Drawing Sheets

IMAGE READING DEVICE AND IMAGE FORMING APPARATUS

This application relates to and claims priority from Japanese Patent Application No. 2013-016588, filed in the Japan Patent Office on Jan. 31, 2013, the entire disclosure of which is incorporated herein by reference.

BACKGROUND

The present disclosure relates to an image reading device, and an image forming apparatus incorporated with the image reading device. The present disclosure particularly relates to a technology, in which document image reading is recovered, in the case where the document image reading is interrupted resulting from cutoff of supply of power supply voltage to a driving portion by an interlock mechanism.

Conventionally, there are known two reading methods, as a method for reading a document image by an image reading device. One of the methods is a method, in which a document is automatically fed by an automatic document feeder, and a document image is read in a state that a carriage is fixed at a predetermined reading position. The other of the methods is a method, in which a document is manually placed on a document platen, and a document image is read while moving a carriage.

Further, there is known an image reading device provided with a so-called interlock mechanism. The image reading device is configured such that, in the case where an openable/closable cover mounted on an apparatus body to be openable and closable is opened, supply of power supply voltage to respective driving portions such as an automatic document feeder, a light source in a carriage, a CCD, and a driving motor for moving the carriage is forcibly cut off. In the thus configured image reading device, in the case where the openable/closable cover is opened during an image reading operation by the carriage, the image reading operation is interrupted resulting from cutoff of power supply to the driving portion for driving and moving the carriage by the interlock mechanism.

For instance, let it be assumed that after a document is placed on the document platen, the openable/closable cover is opened during an image reading operation while moving the carriage. In this case, power supply to the driving motor for driving and moving the carriage is cut off by the interlock mechanism, and the movement of the carriage is stopped. This may result in a partial image reading failure.

In such a case, the user may find it difficult to confirm whether a document image has been properly read. For instance, the user may know that a document image has not been properly read, after closing the openable/closable cover for resuming the power supply to the driving portion, and finding that image data representing the document image to be read has not been outputted. In the case where the user finds that a document image has not been properly read, and judges that it is necessary to read the document image again, the user has to perform an operation of causing the image reading device to read the document image.

An object of the present disclosure is to provide a configuration that enables to reduce a user operation of reading a document image again, in the case where the document image reading is interrupted by an operation of an interlock mechanism.

SUMMARY

An image reading device according to an aspect of the present disclosure is provided with an apparatus body, a document setting portion, a reading portion, a driving portion, a power supply portion, a cover, an interlock portion, an open/close detecting portion, and a control portion. The document setting portion is configured to place a document thereon. The reading portion is configured to read an image of the document placed on the document setting portion. The driving portion is configured to move the reading portion along a sub-scan direction. The power supply portion is configured to generate a power supply voltage for operating the driving portion. The cover is configured to be mounted on the apparatus body to be openable and closable. The interlock portion is configured to supply the power supply voltage from the power supply portion to the driving portion in the case where the cover is in a closed state, and cut off supply of the power supply voltage from the power supply portion to the driving portion in the case where the cover is in an opened state, in association with the opened/closed state of the cover. The open/close detecting portion is configured to detect the opened/closed state of the cover. The control portion is configured to (a) execute a scan process of causing the reading portion to read the document image during movement of the reading portion from a first position to a second position in a first direction along the sub-scan direction, (b) execute a return process of returning the reading portion to the first position by moving the reading portion in a second direction opposite to the first direction, (c) execute a reading interruption process of stopping ongoing of the scan process when the open/close detecting portion detects that the cover is in an opened state during execution of the scan process, and executing the return process when the open/close detecting portion detects that the cover is in a closed state next time, and (d) execute a re-scan process of executing the scan process again after completion of the reading interruption process.

These and other objects, features and advantages of the present disclosure will become more apparent upon reading the following detailed description along with the accompanying drawings.

DETAILED DESCRIPTION

Figure 1:
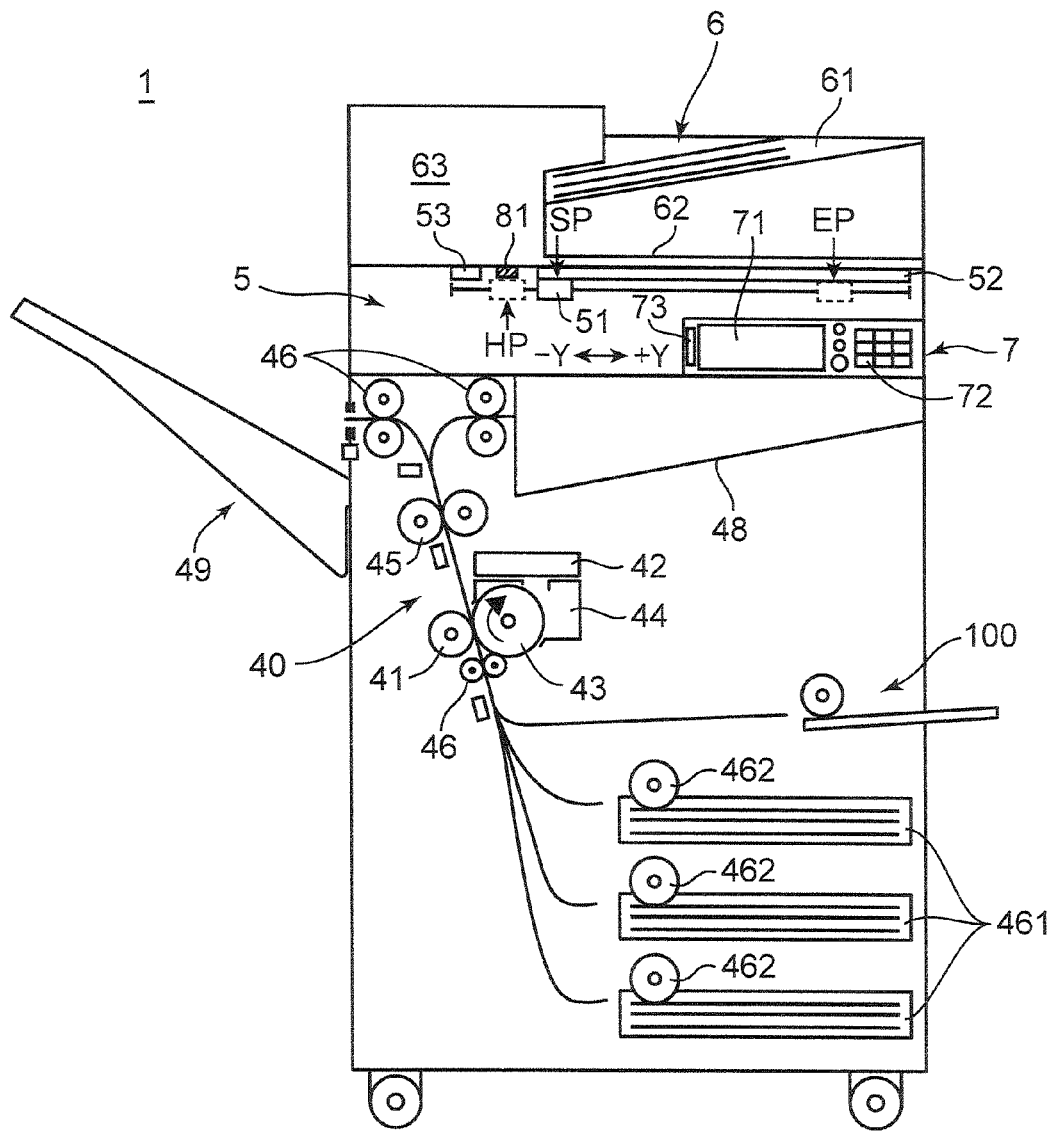
FIG. 1 is a schematic configuration diagram of a complex machine as an example of an image forming apparatus embodying the present disclosure.
Figure 2:
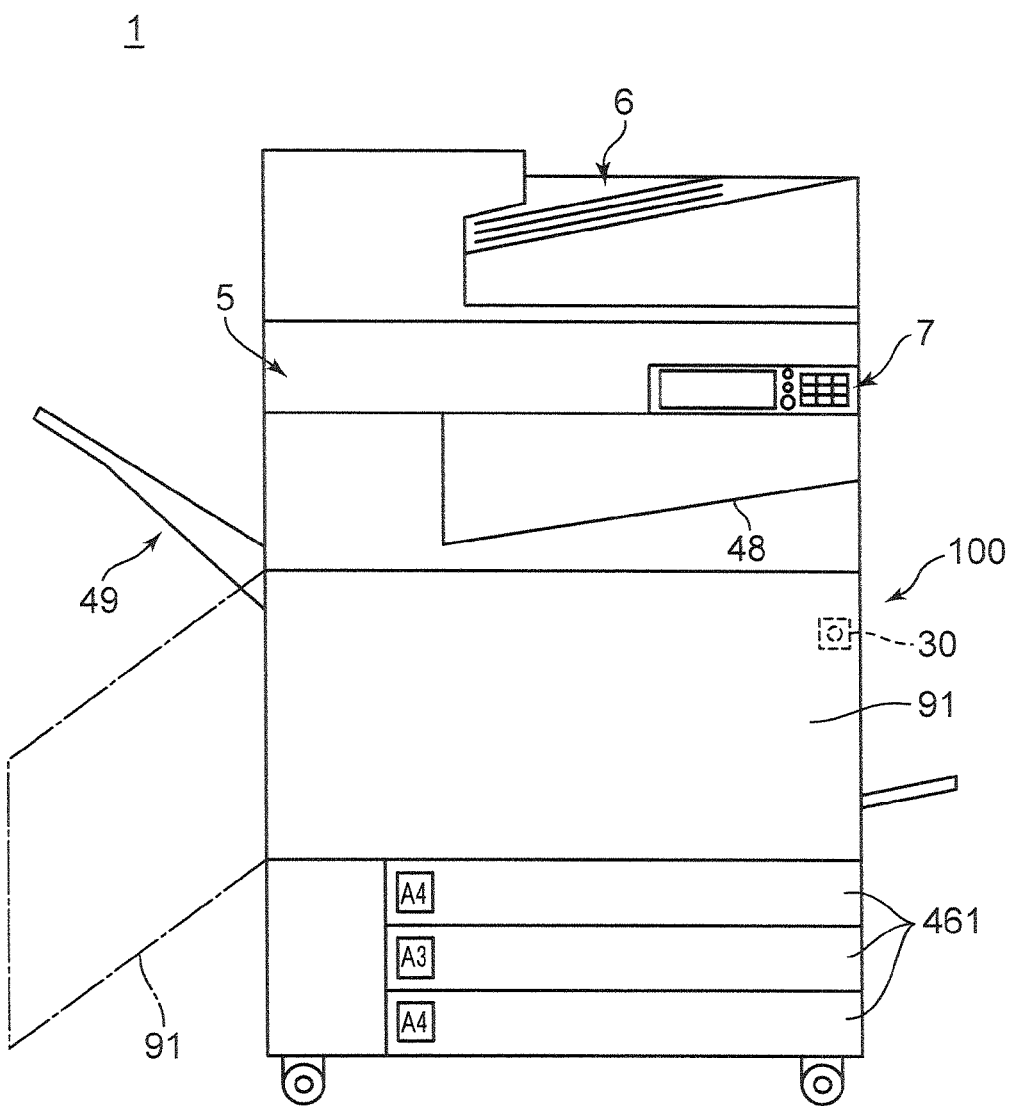
FIG. 2 is a diagram schematically showing an external appearance of the complex machine.

In the following, an embodiment of the present disclosure is described referring to the drawings. FIG. 1 is a schematic configuration diagram of a complex machine 1, as an example of an image forming apparatus embodying the present disclosure. FIG. 2 is a diagram schematically showing an external appearance of the complex machine 1.

As shown in FIG. 1, the complex machine 1 is provided with a document reading portion 5, a standby position detection sensor 81 (a position detecting portion), a document feeder 6, an operating portion 7, a main body portion 100 (an apparatus body), and a stack tray 49.

The document reading portion 5 is provided with a carriage (a reading portion) constituted of a CCD (Charge Coupled Device) and an exposure lamp or the like, a document platen 52 (a document setting portion) constituted of a transparent member such as glass, and a document reading slit 53.

The carriage 51 is coupled to a wire (not shown) which is wound around a drum (not shown) to be driven and rotated by a scanner motor 54 to be described later. The carriage 51 is moved in a sub-scan direction Y by causing the wire to move in the sub-scan direction Y by rotating the drum. The carriage 51 reads an image of a document placed on the document platen 52, and an image of a document fed by the document feeder 6 under the control of a scan control portion 12 to be described later.

The carriage 51 waits for an input of an instruction from the scan control portion 12 to be described later at a predetermined standby position HP, which is located in +Y direction in FIG. 1 along the sub-scan direction Y than the document reading slit 53. The standby position HP corresponds to an example of a first position in the present disclosure.

The carriage 51 is moved along the sub-scan direction Y from the standby position HP to a reading start position SP in +Y direction (in a first direction along the sub-scan direction Y) in FIG. 1 along the sub-scan direction Y, in the case where an image of a document placed on the document platen 52 is read. The reading start position SP is set as a position at which a leading end of a document in the sub-scan direction Y is aligned on the document platen 52.

The carriage 51 reads the image of the document placed on the document platen 52, while moving at a predetermined fixed speed from the reading start position SP to a reading end position EP. The reading end position EP is a position at which a trailing end of the document in the sub-scan direction Y is aligned on the document platen 52. The reading end position EP differs with respect to each of the sizes of the documents settable on the document platen 52. The reading end position EP is not limited to the above, but may be a predetermined fixed position in accordance with the largest size of a document settable on the document platen 52. The reading end position EP corresponds to an example of a second position in the present disclosure.

The carriage 51 outputs image data representing a read document image to a control portion 10 to be described later. After the document image is read, the carriage 51 is moved from the reading end position EP to the standby position HP in a direction (in −Y direction in FIG. 1, a second direction) opposite to the image reading direction.

On the other hand, in the case where a document fed by the document feeder 6 is read, the carriage 51 is moved from the standby position HP to a position facing the document reading slit 53. Then, the carriage 51 reads a document image synchronously with a document feeding operation by the document feeder 6 through the document reading slit 53. Then, the carriage 51 outputs image data representing the read document image to the control portion 10.

The standby position detection sensor 81 is disposed near the standby position HP, and detects whether the carriage 51 is present at the standby position HP. The standby position detection sensor 81 is constituted of a reflective photosensor provided with a light emitting element and a light receiving element, for instance. The standby position detection sensor 81 detects that the carriage 51 is present at the standby position HP, in the case where light outputted from the light emitting element toward the standby position HP is reflected on the carriage 51 and the reflected light is received by the light receiving element. In this case, the standby position detection sensor 81 outputs, to the control portion 10 to be described later, a detection signal indicative of the presence of the carriage 51 at the standby position HP. On the other hand, in the case where light outputted from the light emitting element toward the standby position HP is not reflected, and is not received by the light receiving element, the standby position detection sensor 81 detects that the carriage 51 is not present at the standby position HP. In this case, the standby position detection sensor 81 outputs, to the control portion 10, a detection signal indicative of the absence of the carriage 51 at the standby position HP.

The document feeder 6 is provided with a document setting portion 61 configured to place a document thereon, a document discharge portion 62 configured to discharge a document after an image reading operation thereon, and a document feeding mechanism 63. The document feeding mechanism 63 dispenses the documents placed on the document setting portion 61 one by one, feeds each of the documents to a position facing the document reading slit 53, and discharges the documents onto the document discharge portion 62. Further, the main body of the document feeder 6 is configured to be openable and closable with respect to the document platen 52. In other words, the user is allowed to place a document such as a book in an opened state on the top surface of the document platen 52 by lifting up the document feeder 6 in such a way as to expose the top surface of the document platen 52.

The main body portion 100 is provided with sheet cassettes 461, sheet feeding rollers 462, and a recording portion 40. The sheet cassettes 461 are respectively configured to accommodate sheets of different sizes from each other. Each of the sheet feeding rollers 462 dispenses the sheets from each of the sheet cassettes 461 one by one, and conveys the sheet to the recording portion 40. The recording portion 40 forms an image on the sheet conveyed from each of the sheet cassettes 461.

The recording portion 40 is provided with a photosensitive drum 43, an exposure portion 42, a developing portion 44, a transfer portion 41, a fixing portion 45, and a sheet conveying portion 46. The exposure portion 42 outputs laser light based on image data acquired by the carriage 51. The exposure portion 42 forms an electrostatic latent image on the photosensitive drum 43 by scanning the surface of the photosensitive drum 43 with the outputted laser light. The developing portion 44 forms a toner image by adhering toner to the electrostatic latent image on the surface of the photosensitive drum 43. The transfer portion 41 transfers the toner image on the surface of the photosensitive drum 43 onto the sheet. The fixing portion 45 fixes the toner image on the sheet by heating the sheet carrying the toner image. The sheet conveying portion 46 conveys the sheet by a conveyor roller disposed on a sheet conveyance path in the recording portion 40, and discharges the sheet onto the stack tray 49 or onto a discharge tray 48.

The operating portion 7 is provided with a display portion 71 configured to display information, an operation key portion 72 configured to allow the user to perform various instructions, and a speaker 73. The display portion 71 is constituted of a liquid crystal display or the like having a touch panel function, for instance. The operation key portion 72 is provided with various key switches such as a start key configured to allow the user to input an instruction to execute printing, and a numeric keypad configured to allow the user to input the number of copies to be printed, for instance. The speaker 73 is a device configured to output predetermined sound in accordance with an instruction inputted from the control portion 10 to be described later.

As shown in FIG. 2, the main body portion 100 is provided with an openable/closable cover 91 and an interlock switch 30 (an interlock portion).

The openable/closable cover 91 is mounted to be openable and closable with respect to the main body portion 100. When the openable/closable cover 91 is in a closed state (a state shown by the solid line in FIG. 2), the user cannot touch the inside of the main body portion 100 (such as the sheet conveying portion 46).

The interlock switch 30 is constituted of a pressing button switch having a projection formed thereon, for instance. The interlock switch 30 is switchable between an on-state and an off-state in association with an opened/closed state of the openable/closable cover 91 (a cover). When the openable/closable cover 91 is in a closed state (a state shown by the solid line in FIG. 2), the interlock switch 30 is brought to an on-state due to pressing of the projection by the openable/closable cover 91. On the other hand, when the openable/closable cover 91 is in an opened state (a state shown by the one-dotted chain line in FIG. 2), the interlock switch 30 is brought to an off-state by release from the pressing of the projection.

Figure 3:
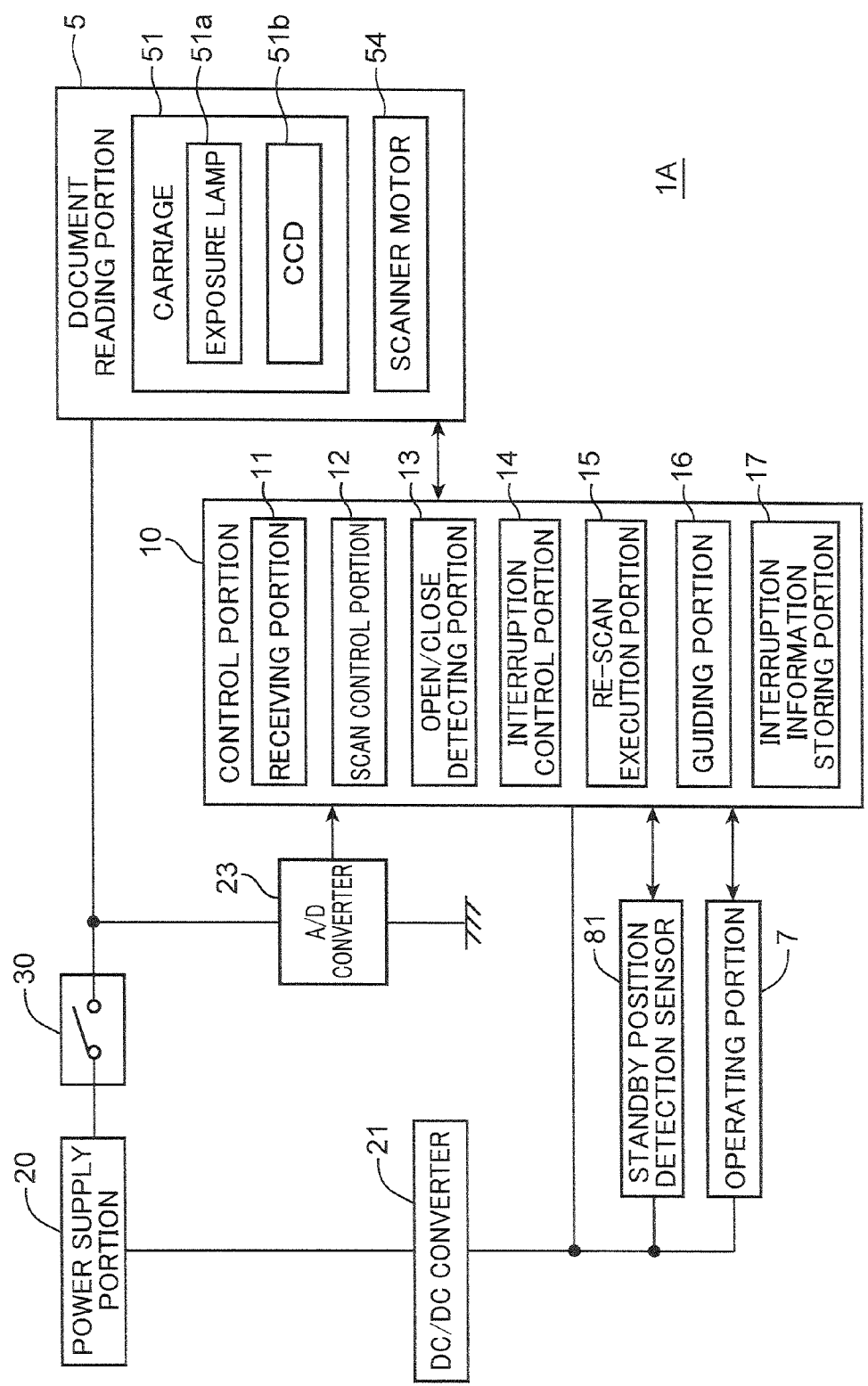
FIG. 3 is a block diagram showing an electrical configuration of an image reading device incorporated in the complex machine, as an example of an image reading device embodying the present disclosure.

In the following, an electrical configuration of an image reading device 1A incorporated in the complex machine 1 is described in details. FIG. 3 is a block diagram showing an example of an electrical configuration of the image reading device 1A incorporated in the complex machine 1, as an example of the image reading device embodying the present disclosure. As shown in FIG. 3, the image reading device 1A includes a power supply portion 20, a DC/DC converter 21, the interlock switch 30, the document reading portion 5, the standby position detection sensor 81, the operating portion 7, an A/D converter 23, and the control portion 10. The image reading device 1A includes the main body portion 100 and the openable/closable cover 91 shown in FIG. 2.

The power supply portion 20 is constituted of a switching power supply circuit, for instance. The power supply portion 20 converts an alternate-current voltage to be supplied from an alternate-current power supply such as a commercial power supply to a direct-current voltage of a predetermined voltage value. In this way, the power supply portion 20 generates a power supply voltage to be used in an operation of the document reading portion 5, the standby position detection sensor 81, the operating portion 7, and the control portion 10.

The DC/DC converter 21 converts a voltage value of a power supply voltage generated by the power supply portion 20 to a predetermined control voltage value to be used in an operation of the standby position detection sensor 81, the operating portion 7, and the control portion 10.

As described above, the interlock switch 30 is switchable between an on-state and an off-state in association with opening/closing of the openable/closable cover 91. The interlock switch 30 is brought to an on-state when the openable/closable cover 91 is in a closed state, and a current path from the power supply portion 20 to the A/D converter 23 and to the document reading portion 5 is formed. As a result of the above operation, a power supply voltage is supplied to the A/D converter 23 and to the document reading portion 5. Thus, a power supply voltage is supplied to a scanner motor 54 provided in the document reading portion 5, which will be described later. On the other hand, when the openable/closable cover 91 is in an opened state, the interlock switch 30 is brought to an off-state, and the current path from the power supply portion 20 to the A/D converter 23 and to the document reading portion 5 is cut off. As a result of the above operation, supply of power supply voltage to the A/D converter 23 and to the document reading portion 5 is cut off. Thus, supply of power supply voltage to the scanner motor 54 provided in the document reading portion 5 is cut off.

The document reading portion 5 is provided with the carriage 51 and the scanner motor 54 (a driving portion). The carriage 51 includes the exposure lamp 51a and the CCD 51b.

The scanner motor 54 is driven and rotated under the control of the scan control portion 12 to be described later for driving and rotating the drum (not shown). By rotating the drum, the carriage 51 coupled to the wire (not shown) wound on the drum is moved along the sub-scan direction Y (see FIG. 1).

The scanner motor 54 is constituted of a stepping motor, for instance. Specifically, the scanner motor 54 is provided with two input portions respectively configured to receive a direction instruction signal and a pulse-like driving signal (a pulse signal). The direction instruction signal is a signal indicative of a rotating direction (clockwise rotation or counterclockwise rotation) of the scanner motor 54 by judgment as to whether the signal level is high or low. The direction instruction signal and the driving signal correspond to an example of an instruction signal in the present disclosure.

For instance, in the case where the direction instruction signal has a low level, the scanner motor 54 is rotated clockwise to thereby move the carriage 51 rightwardly (in +Y direction) in FIG. 1 along the sub-scan direction Y. On the other hand, in the case where the direction instruction signal has a high level, the scanner motor is rotated counterclockwise to thereby move the carriage 51 leftwardly (in −Y direction) in FIG. 1 along the sub-scan direction Y.

Further, in response to input of a pulse-like driving signal, the scanner motor 54 is driven and rotated stepwise by a predetermined rotation angle, each time a pulse of of the driving signal is inputted. By performing the above operation, the carriage 51 is moved in the sub-scan direction Y by a moving amount corresponding to the rotation angle.

The scanner motor 54 is not limited to the above. For instance, the scanner motor 54 may be provided with two input portions respectively configured to receive a pulse-like driving signal for rotating the scanner motor 54 clockwise, and a pulse-like driving signal for rotating the scanner motor 54 counterclockwise. Alternatively, the scanner motor 54 may be provided with two input portions respectively configured to receive pulse signals having A phase and B phase different from each other by 90 degrees. The scanner motor 54 may switch the rotating direction between clockwise rotation and counterclockwise rotation by judgment as to whether A phase is advanced with respect to B phase, or B phase is advanced with respect to A phase.

The A/D converter 23 detects a voltage value of a voltage to be supplied from the power supply portion 20 via the interlock switch 30, and outputs a detection signal indicative of the detected voltage value to the control portion 10.

The control portion 10 controls overall operations of the complex machine 1. For instance, the control portion 10 is provided with a CPU (Central Processing Unit) which executes a predetermined arithmetic process, a non-volatile memory such as an EEPROM (Electrically Erasable and Programmable Read Only Memory) which stores a predetermined control program, a RAM (Random Access Memory) which temporarily stores data, and peripheral circuits thereof.

The control portion 10 constitutes a receiving portion 11, the scan control portion 12, an open/close detecting portion 13, an interruption control portion 14, a re-scan execution portion 15, and a guiding portion 16 by executing the control program stored in the non-volatile memory. Further, the control portion 10 uses a part of a storage area of the RAM as an interruption information storing portion 17.

The receiving portion 11 receives various instructions inputted by the user through the operating portion 7. Examples of the instructions include a selection instruction as to whether a document image is to be read, and an instruction to setting a size of a document to be read or the like.

The scan control portion 12 executes a scan process and a return process. The scan process is a process of moving the carriage 51 from the standby position HP to the reading end position EP rightwardly (in a first direction, +Y direction) in FIG. 1 along the sub-scan direction Y, and causing the carriage 51 to read a document image during the movement thereof. The return process is a process of returning the carriage 51 to the standby position HP by moving the carriage 51 in a direction (in a second direction, −Y direction) opposite to the direction in the scan process along the sub-scan direction Y.

The scan control portion 12 outputs a pulse-like driving signal and a direction instruction signal to the scanner motor 54 in a scan process and in a return process. By performing the above operation, the scanner motor 54 is driven and rotated stepwise in a rotating direction represented by the direction instruction signal by a predetermined rotation angle, each time a pulse of the driving signal is inputted. In other words, the scanner motor 54 moves the carriage 51 by a predetermined fixed moving amount, each time a pulse of the driving signal is inputted.

According to the above configuration, the scan control portion 12 recognizes the rotation angle of the carriage 51 by the number of pulses of a driving signal outputted to the scanner motor 54. Thus, the scan control portion 12 recognizes the moving amount of the carriage 51. In this way, in the scan process, the scan control portion 12 causes the carriage 51 to read a document image by detecting that the carriage 51 has moved from the reading start position SP to the reading end position EP.

The open/close detecting portion 13 detects an opened/closed state of the openable/closable cover 91, based on a voltage value represented by a detection signal outputted from the A/D converter 23.

Specifically, the open/close detecting portion 13 periodically detects an opened/closed state of the openable/closable cover 91, each time a predetermined time (e.g. one second) is elapsed, based on a voltage value represented by a detection signal to be outputted from the A/D converter 23. When the openable/closable cover 91 is brought to an opened state, the interlock switch 30 is brought to an off-state. Then, a current path from the power supply portion 20 to the A/D converter 23 is cut off, and the voltage value detected by the A/D converter 23 is lowered. Thus, the open/close detecting portion 13 detects that the openable/closable cover 91 is in an opened state when the voltage value represented by the detection signal outputted from the A/D converter 23 is lower than a predetermined reference voltage value. On the other hand, when the openable/closable cover 91 is brought to a closed state, the interlock switch 30 is brought to an on-state, and a current path from the power supply portion 20 to the A/D converter 23 is formed. Thus, the open/close detecting portion 13 detects that the openable/closable cover 91 is in a closed state when the voltage value detected by the A/D converter 23 is not lower than the reference voltage value. The reference voltage value is set to a voltage value lower than a control voltage value by a predetermined voltage value. The control voltage value is a voltage value of a voltage to be supplied from the DC/DC converter 21 to the control portion 10, for instance.

The interruption control portion 14 executes a reading interruption process, in the case where the open/close detecting portion 13 detects that the openable/closable cover 91 is in an opened state during execution of a scan process by the scan control portion 12. The reading interruption process is a process of stopping ongoing of the scan process, and executing a return process by the scan control portion 12 in response to detection of a closed state of the openable/closable cover 91 by the open/close detecting portion 13.

The re-scan execution portion 15 executes a re-scan process after completion of the reading interruption process by the interruption control portion 14. The re-scan process is a process of executing a scan process again by the scan control portion 12.

The guiding portion 16 causes the display portion 71 to display a screen of prompting the user to input a selection instruction as to whether image reading is to be performed.

The interruption information storing portion 17 stores interruption information indicative of interruption of image reading in a scan process.

Figure 4:
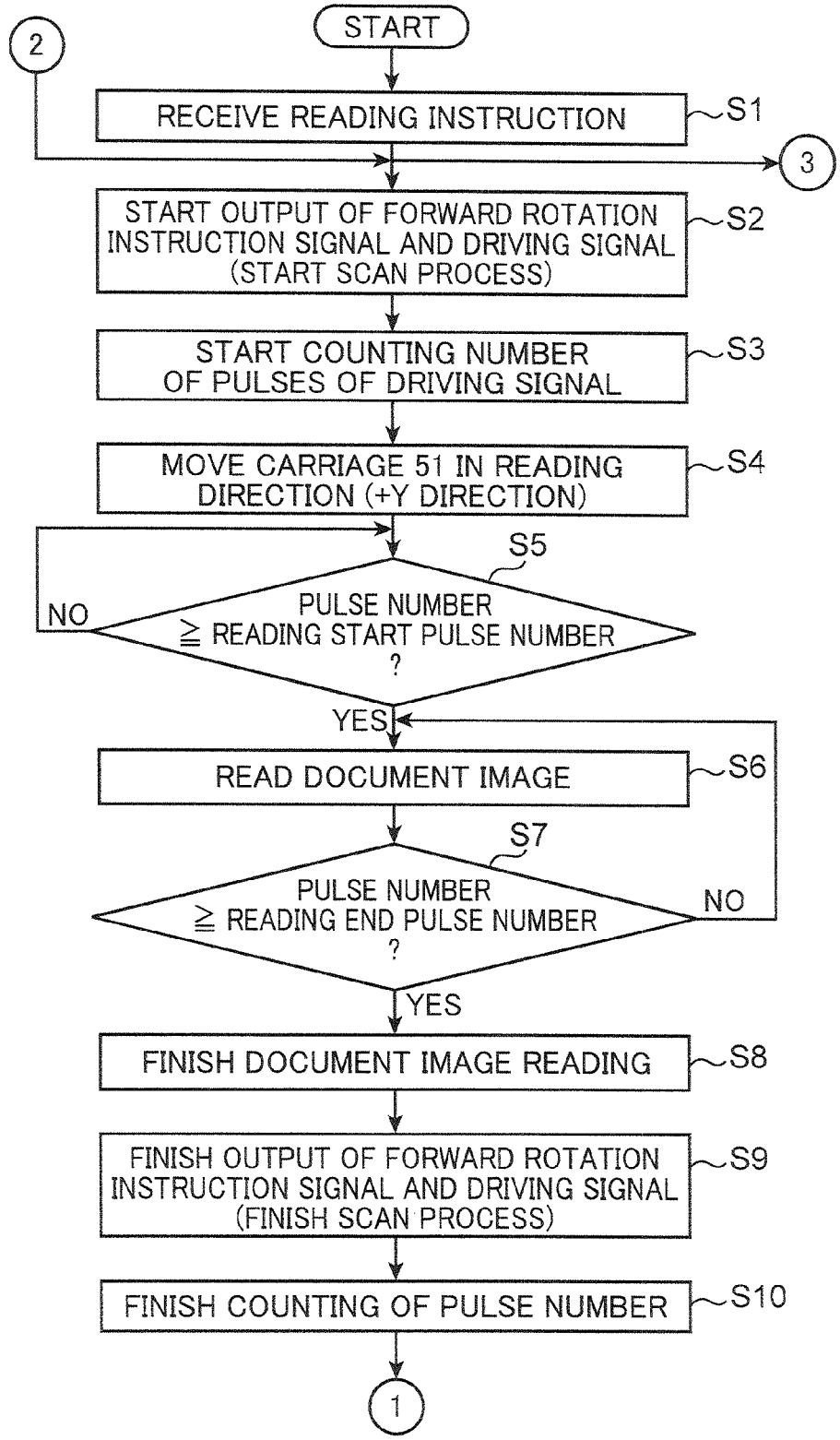
FIG. 4 is a flowchart showing a first half of an image reading operation to be performed by using an image reading portion.
Figure 5:
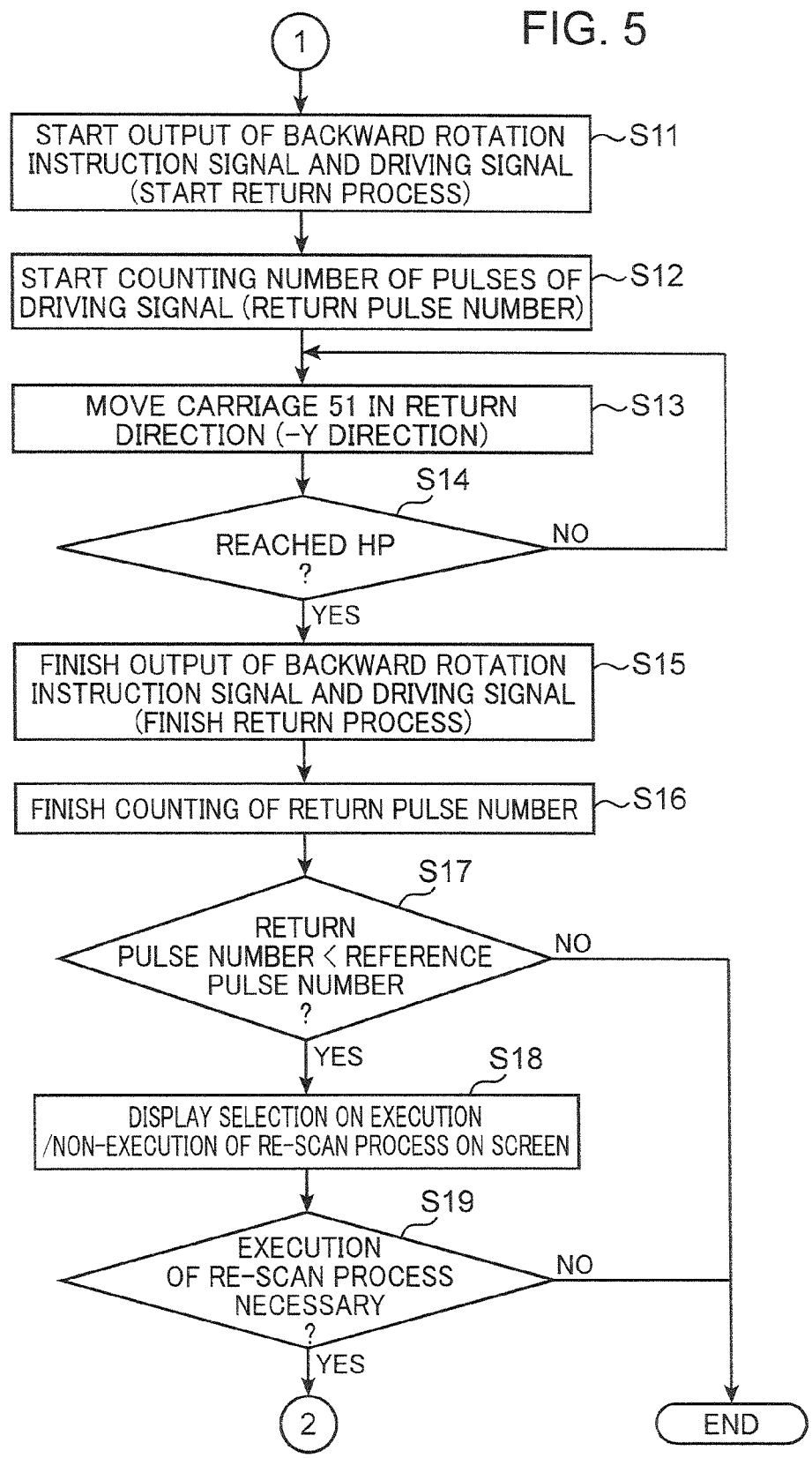
FIG. 5 is a flowchart showing a second half of the image reading operation to be performed by using the image reading portion.
Figure 6:
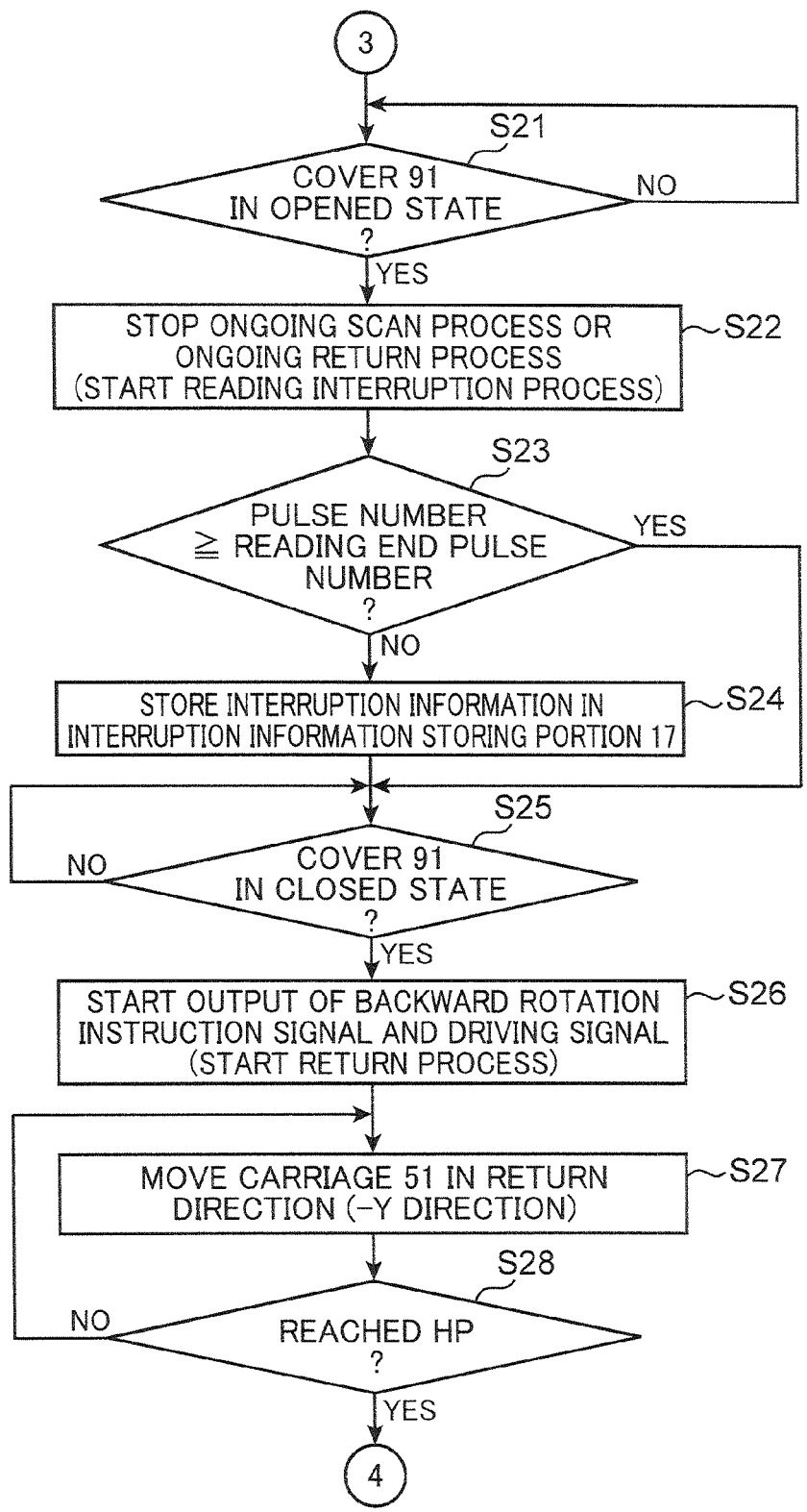
FIG. 6 is a flowchart showing a first half of an operation of a reading interruption process to be performed by an interruption control portion.
Figure 7:
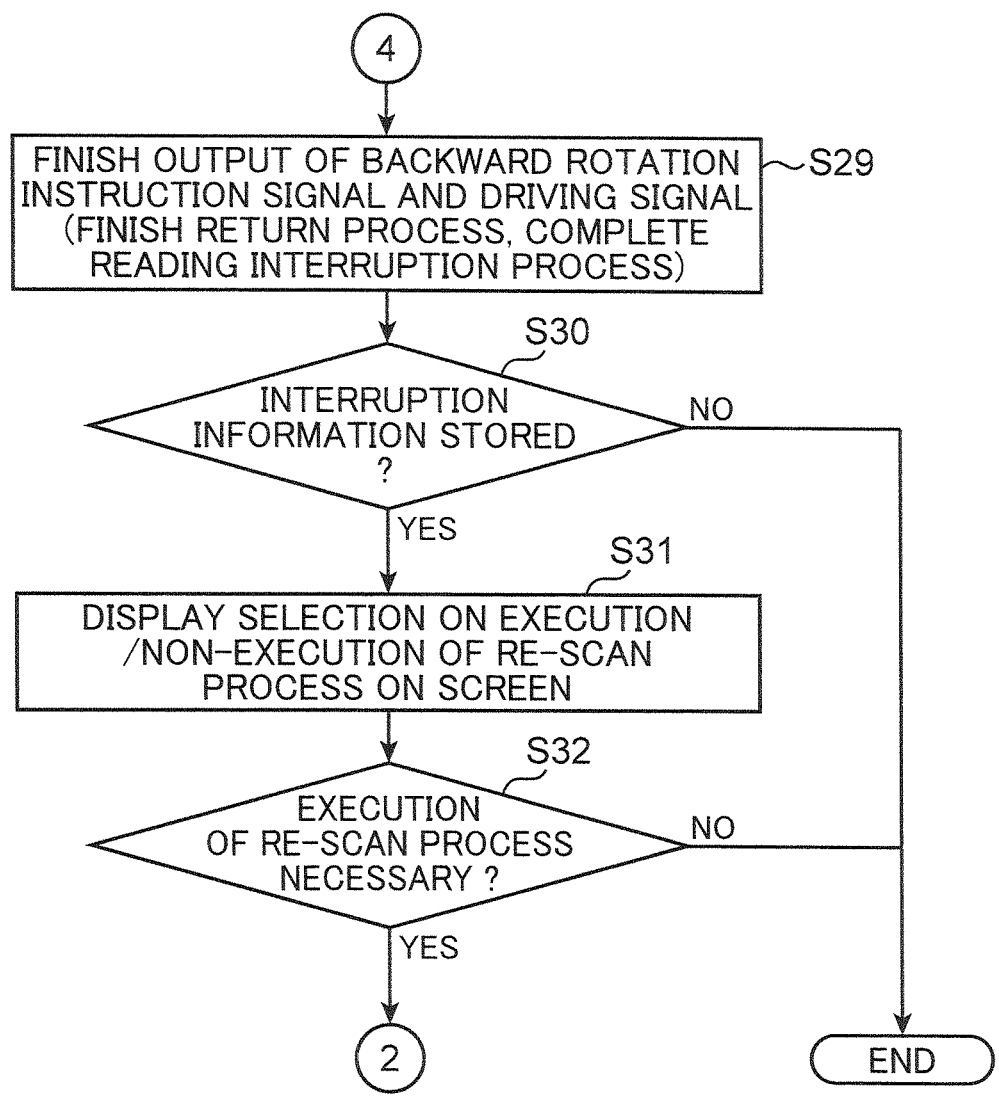
FIG. 7 is a flowchart showing a second half of the operation of the reading interruption process to be performed by the interruption control portion.

In the following, an image reading operation to be performed by using the document reading portion 5 is described. FIG. 4 and FIG. 5 are a flowchart showing an image reading operation to be performed by using the document reading portion 5. FIG. 6 and FIG. 7 are a flowchart showing an operation of a reading interruption process to be performed by the interruption control portion 14.

As shown in FIG. 4, when the receiving portion 11 receives an instruction to read a document image, which has been inputted by the user through the operating portion 7 (in Step S1), the scan control portion 12 starts a scan process. Specifically, the scan control portion 12 starts to output a low-level direction instruction signal (hereinafter, called as a forward rotation instruction signal) and a pulse-like driving signal to the scanner motor 54 for moving the carriage 51 from the standby position HP rightwardly (hereinafter, called as a reading direction (+Y direction)) in FIG. 1 along the sub-scan direction Y (in Step S2). The scan control portion 12 continues to output a forward rotation instruction signal and a driving signal until the output of the forward rotation instruction signal and the driving signal is finished in Step S9 to be described later. Subsequently, the scan control portion 12 starts to count the number of pulses of the outputted driving signal (in Step S3). By performing the above operation, the scanner motor 54 is driven and rotated stepwise by a predetermined rotation angle, each time a pulse of the driving signal is inputted until the output of the forward rotation instruction signal and the driving signal by the scan control portion 12 is finished in Step S9 to be described later for moving the carriage 51 in the reading direction (in +Y direction) (in Step S4).

Subsequently, after the instruction to read a document image has been received in Step S1, as shown in FIG. 6, the interruption control portion 14 starts a determination process of determining whether the open/close detecting portion 13 has detected that the openable/closable cover 91 is in an opened state (in Step S21), concurrently with the operation in Step S2 and thereafter. During a time when the open/close detecting portion 13 is inoperative to detect that the openable/closable cover 91 is in an opened state (NO in Step S21), the interruption control portion 14 is in a standby state. In response to detection of an opened state of the openable/ closable cover 91 by the open/close detecting portion 13 (YES in Step S21), the interruption control portion 14 starts to execute the reading interruption process of Step S22 and thereafter. By performing the above operation, the interruption control portion 14 stops the process of Step S2 and thereafter. The reading interruption process will be described later in detail.

Referring back to FIG. 4, the scan control portion 12 determines whether the counted number of pulses has reached a predetermined reading start pulse number (in Step S5). The reading start pulse number is set to the number of pulses of a driving signal necessary for driving and rotating the scanner motor 54 in order to move the carriage 51 from the standby position HP to the reading start position SP.

In the case where it is determined that the counted number of pulses has reached the predetermined reading start pulse number (YES in Step S5), the scan control portion 12 determines that the carriage 51 has reached the reading start position SP. Subsequently, the scan control portion 12 starts to cause the carriage 51 to perform an image reading operation (in Step S6).

Subsequently, the scan control portion 12 determines whether the counted number of pulses has reached a predetermined reading end pulse number (in Step S7). The reading end pulse number is set to the number of pulses of a driving signal necessary for driving and rotating the scanner motor 54 in order to move the carriage 51 from the standby position HP to the reading end position EP. The reading end position EP is set with respect to each of the sizes of the documents settable on the document platen 52. Accordingly, the reading end pulse number is also set with respect to each of the sizes of the documents settable on the document platen 52.

For instance, let it be assumed that the receiving portion 11 has received an instruction to read a document image, and an instruction to set a size (e.g. A5 size) of a document in Step S1. In this case, the reading end pulse number corresponding to the received document size (A5 size) is used for the determination in Step S7. On the other hand, in the case where the receiving portion 11 has not received an instruction to set a document size in Step S1, the reading end pulse number corresponding to the largest size (e.g. A4 size) out of the sizes of the documents settable on the document platen 52 is used in the determination in Step S7.

In the case where it is determined that the counted number of pulses has not reached the reading end pulse number (NO in Step S7), the scan control portion 12 continues to output a forward rotation instruction signal and a driving signal, continues to count the number of pulses, and continues the rotating operation of the scanner motor 54 (in Step S4) and the image reading operation by the carriage 51 (in Step S6). Thereafter, in the case where it is determined that the counted number of pulses has reached the reading end pulse number (YES in Step S7), the scan control portion 12 determines that the carriage 51 has reached the reading end position EP. In this case, the scan control portion 12 causes the carriage 51 to finish the image reading operation (in Step S8), and finishes the output of the forward rotation instruction signal and the driving signal (in Step S9). By performing the above operation, the scan control portion 12 finishes the scan process. Subsequently, the scan control portion 12 finishes counting of the number of pulses of the driving signal (in Step S10).

As shown in FIG. 5, when the scan process is finished, the scan control portion 12 starts a return process. Specifically, the scan control portion 12 starts to output a high-level direction instruction signal (hereinafter, called as a backward rotation instruction signal) and a pulse-like driving signal to the scanner motor 54 for moving the carriage 51 leftwardly (hereinafter, called as a return direction (−Y direction)) in FIG. 1 along the sub-scan direction Y (in Step S11). The scan control portion 12 continues to output a backward rotation instruction signal and a driving signal until the output of the backward rotation instruction signal and the driving signal is finished in Step S15 to be described later. Subsequently, the scan control portion 12 starts to count the number of pulses (hereinafter, called as the return pulse number) of the outputted driving signal (in Step S12). By performing the above operation, the scanner motor 54 is driven and rotated stepwise by a predetermined rotation angle, each time a pulse of the driving signal is inputted until the output of the backward rotation instruction signal and the driving signal by the scan control portion 12 is finished in Step S15 to be described later for moving the carriage 51 in the return direction (in −Y direction) (in Step S13).

During a time when the standby position detection sensor 81 outputs a detection signal indicative of the absence of the carriage 51 at the standby position HP (NO in Step S14), the scan control portion 12 continues to output a backward rotation instruction signal and a driving signal, continues to count the return pulse number, and continues the operation of moving the carriage 51 in the return direction by the scanner motor 54 (in Step S13). Thereafter, in the case where the standby position detection sensor 81 outputs a detection signal indicative of the presence of the carriage 51 at the standby position HP (YES in Step S14), the scan control portion 12 finishes the output of the backward rotation instruction signal and the driving signal (in Step S15). By performing the above operation, the scan control portion 12 finishes the return process. Subsequently, the scan control portion 12 finishes counting of the return pulse number (in Step S16).

Subsequently, the re-scan execution portion 15 determines whether the return pulse number counted by the scan control portion 12 is smaller than a predetermined reference pulse number (a reference value) (in Step S17). The reference pulse number is set to the number of pulses of a driving signal necessary for driving and rotating the scanner motor 54 in order to move the carriage 51 from the reading end position EP to the standby position HP in the return direction (in −Y direction). The reading end position EP is set with respect to each of the sizes of the documents settable on the document platen 52. Accordingly, the reference pulse number is also set with respect to each of the sizes of the documents settable on the document platen 52.

For instance, let it be assumed that the receiving portion 11 has received an instruction to read a document image, and an instruction to set a size (e.g. A5 size) of a document in Step S1. In this case, the reference pulse number corresponding to the received document size (A5 size) is used in the determination in Step S17. On the other hand, in the case where the receiving portion 11 has not received an instruction to set a document size in Step S1, the reference pulse number corresponding to the largest size (e.g. A4 size) out of the sizes of the documents settable on the document platen 52 is used in the determination in Step S17.

In Step S17, in the case where the re-scan execution portion 15 determines that the return pulse number counted by the scan control portion 12 is smaller than the reference pulse number (YES in Step S17), it is conceived that the carriage 51 has returned to the standby position HP from a certain position in a zone from the standby position HP to the reading end position EP.

For instance, let it be assumed that in a scan process prior to a return process, the openable/closable cover 91 is instantaneously opened/closed during a time from periodical detection of an opened/closed state of the openable/closable cover 91 by the open/close detecting portion 13 to detection of an opened/closed state of the openable/closable cover 91 next time. In this case, the open/close detecting portion 13 may not properly detect an opened state of the openable/closable cover 91. Thus, in the case where an opened state of the openable/closable cover 91 is not detected, a reading interruption process is not executed. Accordingly, the process of Step S2 and thereafter is not interrupted. On the other hand, in the case where the openable/closable cover 91 is instantaneously opened/closed, supply of power supply voltage to the scanner motor 54 is instantaneously cut off by the interlock switch 30, and as a result, the scanner motor 54 is stepped out and stopped. Consequently, the return process is executed, after the scan process is continued in a state that the carriage 51 is halted at a certain position in a zone from the standby position HP to the reading end position EP during the scan process. Then, in the case where driving of the scanner motor 54 is resumed in the return process, the carriage 51 is returned to the standby position HP from the certain position at which the carriage 51 is halted in the zone from the standby position HP to the reading end position EP during the scan process.

In the above case, in the scan process, an image in a region from the position at which the carriage 51 is halted to the reading end position EP is not read, out of the image of the document. In other words, the document is in a state that image reading is interrupted. In this case (YES in Step S17), the re-scan execution portion 15 causes the guiding portion 16 to display, on the display portion 71, a screen of prompting the user to input a selection instruction as to whether image reading is to be performed so that the user can select whether a re-scan process is to be executed (in Step S18).

Thereafter, in the case where the user visually recognizes the screen displayed on the display portion 71, and the receiving portion 11 has received a selection instruction to read a document image, which has been inputted by the user through the operating portion 7 (YES in Step S19), the re-scan execution portion 15 executes a re-scan process. In other words, the process of Step S2 and thereafter is repeated so that the re-scan execution portion 15 causes the scan control portion 12 to execute a scan process again. On the other hand, in the case where the receiving portion 11 has received a selection instruction not to read a document image, which has been inputted by the user through the operating portion 7 (NO in Step S19), the re-scan execution portion 15 causes the scan control portion 12 to finish the image reading operation without executing a re-scan process.

On the other hand, in Step S17, in the case where the re-scan execution portion 15 determines that the return pulse number counted by the scan control portion 12 is not smaller than the reference pulse number (NO in Step S17), it is conceived that the carriage 51 has returned to the standby position HP after the scan process has been normally finished.

For instance, let it be assumed that a return process is normally finished after a scan process has been normally finished. In this case, the carriage 51 is returned from the reading end position EP to the standby position HP. Accordingly, in Step S17, the re-scan execution portion 15 determines that the return pulse number counted by the scan control portion 12 coincides with the reference pulse number.

Further, for instance, let it be assumed that during execution of a return process after a scan process has been normally finished, the openable/closable cover 91 is instantaneously opened/closed during a time from periodical detection of an opened/closed state of the openable/closable cover 91 by the open/close detecting portion 13 to detection of an opened/closed state of the openable/closable cover 91 next time. In this case, the open/close detecting portion 13 may not properly detect an opened state of the openable/closable cover 91. In the case where an opened state of the openable/closable cover 91 is not detected, a reading interruption process is not executed. Accordingly, the process of Step S2 and thereafter is not interrupted. On the other hand, in the case where the openable/closable cover 91 is instantaneously opened/closed, supply of power supply voltage to the scanner motor 54 is instantaneously cut off by the interlock switch 30, and as a result, the scanner motor 54 is stepped out and stopped. Consequently, the return process is continued in a state that the carriage 51 is halted, and counting of the return pulse number which has been started in Step S12 is continued. As described above, after a scan process has been normally finished, in the case where the carriage 51 is halted during execution of a return process without detection of an opened state of the openable/closable cover 91, and thereafter, driving of the scanner motor 54 is resumed, the re-scan execution portion 15 determines that the return pulse number counted by the scan control portion 12 is not smaller than the reference pulse number in Step S17, because counting of the return pulse number which has been started in Step S12 is continued.

As described above, in the case where the re-scan execution portion 15 determines that the return pulse number counted by the scan control portion 12 is not smaller than the reference pulse number (NO in Step S17), the re-scan execution portion 15 causes the scan control portion 12 to finish the image reading operation, based on a judgment that the scan process has been normally finished.

On the other hand, after an instruction to read a document image has been received in Step S1, as shown in FIG. 6, the interruption control portion 14 starts a determination process of determining whether the open/close detecting portion 13 has detected that the openable/closable cover 91 is in an opened state, concurrently with the operation of Step S2 and thereafter (in Step S21).

During a time when the open/close detecting portion 13 is inoperative to detect that the openable/closable cover 91 is in an opened state (NO in Step S21), the interruption control portion 14 is in a standby state. In response to detection of an opened state of the openable/closable cover 91 by the open/close detecting portion 13 (YES in Step S21), the interruption control portion 14 starts to execute the reading interruption process. By performing the above operation, the interruption control portion 14 stops ongoing of the scan process or ongoing of the return process which is being executed by the scan control portion 12 (in Step S22).

Specifically, in the case where an opened state of the openable/closable cover 91 is detected in Step S21, the interlock switch 30 is brought to an off-state in association with the opened state of the openable/closable cover 91. In other words, the complex machine 1 is brought to a state that supply of power supply voltage to the scanner motor 54 is cut off. However, supply of power supply voltage of a control voltage value is continued from the power supply portion 20 to the control portion 10 via the DC/DC converter 21. In other words, the scan control portion 12 continues to execute a scan process or a return process, and continues to output a direction instruction signal and a driving signal to the scanner motor 54. In view of the above, in Step S22, in response to receiving an instruction to stop ongoing of the scan process or ongoing of the return process from the interruption control portion 14, the scan control portion 12 stops output of the direction instruction signal and the driving signal to the scanner motor 54, and finishes counting of the number of pulses of the driving signal. Further, in the case where the scan control portion 12 causes the carriage 51 to perform an image reading operation during ongoing of the scan process, the scan control portion 12 causes the carriage 51 to stop the image reading operation.

On the other hand, let it be assumed that the scan control portion 12 continues to execute a return process, and continues to output a backward rotation instruction signal and a driving signal to the scanner motor 54 when an opened state of the openable/closable cover 91 is detected in Step S21. In this case, in Step S22, in response to receiving an instruction to stop ongoing of the scan process or ongoing of the return process from the interruption control portion 14, the scan control portion 12 stops output of the backward instruction signal and the driving signal to the scanner motor 54, and finishes counting of the return pulse number.

Subsequently, the interruption control portion 14 determines whether the number of pulses counted by the scan control portion 12 has reached the reading end pulse number (in Step S23). For instance, in the case where the interruption control portion 14 determines that the number of pulses counted by the scan control portion 12 has not reached the reading end pulse number (NO in Step S23), the interruption control portion 14 determines that the carriage 51 is present at a certain position in a zone from the standby position HP to the reading end position EP, after an opened state of the openable/closable cover 91 is detected in Step S21, and the scan process is interrupted in Step S22. In other words, in this case (NO in Step S23), the carriage 51 is halted during execution of a scan process, and an image in a region from the position at which the carriage 51 is halted to the reading end position EP is not read, out of the document image. In this case, the interruption control portion 14 determines that image reading is interrupted. In this case (NO in Step S23), the interruption control portion 14 causes the interruption information storing portion 17 to store the interruption information indicating that image reading is interrupted (in Step S24).

On the other hand, in the case where the interruption control portion 14 determines that the number of pulses counted by the scan control portion 12 has reached the reading end pulse number (YES in Step S23), the interruption control portion 14 determines that an opened state of the openable/closable cover 91 is detected in Step S21 after the carriage 51 has passed the reading end position EP, in other words, during a return process after a scan process has been interrupted. In other words, the interruption control portion 14 determines that a scan process has been normally finished, and reading of an image in a region from the reading start position SP to the reading end position EP has been finished. In this case (YES in Step S23), the interruption control portion 14 proceeds the process to Step S25, without storing interruption information in the interruption information storing portion 17.

Subsequently, the interruption control portion 14 waits for a process during a time when the open/close detecting portion 13 detects an opened state of the openable/closable cover 91 (NO in Step S25). Thereafter, in the case where the open/close detecting portion 13 detects that the openable/closable cover 91 is in a closed state (YES in Step S25), the interruption control portion 14 causes the scan control portion 12 to start a return process, and causes the scan control portion 12 to continue output of a backward rotation instruction signal and a driving signal to the scanner motor 54 until causes the scan control portion 12 to finish output of the backward rotation instruction signal and the driving signal in Step S29 to be described later (Step S26). By performing the above operation, the scanner motor 54 moves the carriage 51 in the return direction (in −Y direction) until the output of the backward rotation instruction signal and the driving signal by the scan control portion 12 is finished in Step S29 to be described later (in Step S27).

During a time when the standby position detection sensor 81 outputs a detection signal indicative of the absence of the carriage 51 at the standby position HP (NO in Step S28), the interruption control portion 14 causes the scan control portion 12 to continue output of a backward rotation instruction signal and a driving signal. By performing the above operation, an operation of moving the carriage 51 in the return direction by the scanner motor 54 is continued (in Step S27). Thereafter, in response to output of a detection signal indicative of the presence of the carriage 51 at the standby position HP by the standby position detection sensor 81 (YES in Step S28), as shown in FIG. 7, the interruption control portion 14 causes the scan control portion 12 to finish output of the backward rotation instruction signal and the driving signal. By performing the above operation, the return process by the scan control portion 12, and the reading interruption process by the interruption control portion 14 are completed (in Step S29).

When the reading interruption process is completed, the re-scan execution portion 15 determines whether interruption information is stored in the interruption information storing portion 17 (in Step S30). In Step S30, in the case where the re-scan execution portion 15 determines that interruption information is not stored in the interruption information storing portion 17 (NO in Step S30), the re-scan execution portion 15 determines that reading of an image in a region from the reading start position SP to the reading end position EP is finished by the time when an opened state of the openable/closable cover 91 is detected in Step S21. In this case, the re-scan execution portion 15 causes the scan control portion 12 to finish the image reading operation, without executing a re-scan process.

On the other hand, in Step S30, in the case where the re-scan execution portion 15 determines that interruption information is stored in the interruption information storing portion 17 (YES in Step S30), the re-scan execution portion 15 determines that image reading is interrupted when an opened state of the openable/closable cover 91 is detected in Step S21. In this case, the re-scan execution portion 15 causes the guiding portion 16 to display, on the display portion 71, a screen of prompting the user to input a selection instruction as to whether image reading is to be performed so that the user can select whether a re-scan process is to be executed (in Step S31).

Thereafter, in the case where the user visually recognizes the screen displayed on the display portion 71, and the receiving portion 11 has received a selection instruction to read a document image, which has been inputted by the user through the operating portion 7 (YES in Step S32), the re-scan execution portion 15 executes a re-scan process. In other words, the process of Step S2 and thereafter is repeated so that the re-scan execution portion 15 causes the scan control portion 12 to execute a scan process again. On the other hand, in the case where the receiving portion 11 has received a selection instruction not to read a document image, which has been inputted by the user through the operating portion 7 (NO in Step S32), the re-scan execution portion 15 causes the scan control portion 12 to finish the image reading operation, without executing a re-scan process.

According to the embodiment, in the case where an opened state of the openable/closable cover 91 is detected during execution of a scan process, supply of power supply voltage to the scanner motor 54 is cut off by the interlock switch 30. In response to cutoff of power supply voltage, the scanner motor 54 is stopped, and accordingly, the movement of the carriage 51 is interrupted. As a result, at least a part of the document image is not read by the carriage 51.

As described above, in the case where an opened state of the openable/closable cover 91 is detected, the interruption control portion 14 executes a reading interruption process. Then, after the reading interruption process is executed, the user is prompted to input a selection instruction as to whether image reading is to be performed, before a re-scan process is executed by the re-scan execution portion 15.

As described above, the user is allowed to switch whether a re-scan process is to be executed, as necessary. Further, the user is prompted to input a selection instruction as to whether image reading is to be performed. Accordingly, the above configuration makes it possible for the user to recognize whether a re-scan process is to be executed. Contrary to the above, in the case where a control portion is configured such that the re-scan execution portion 15 automatically executes a re-scan process after a reading interruption process, the user may inadvertently remove the document from the document platen 52, without noticing that a re-scan process is executed. Unlike the above configuration, the embodiment makes it possible for the user to recognize that a re-scan process is executed. Accordingly, the embodiment makes it possible to prevent a possibility that the user may inadvertently remove the document, as described above. In the case where a selection instruction to read a document image is received, the re-scan execution portion 15 executes a re-scan process, in other words, a scan process is executed again.

The above configuration makes it possible to read a document image again, while reducing a user operation of checking whether the document image has been normally read, in the case where the openable/closable cover 91 is brought to an opened state during execution of a scan process, and the document image reading is interrupted resulting from cut off of power supply voltage to the scanner motor 54 by the operation of the interlock switch 30. In other words, the above configuration makes it possible to reduce a user operation of reading a document image again, in the case where the document image reading is interrupted by an operation of the interlock mechanism.

Further, in the case where the openable/closable cover 91 is instantaneously opened/closed during execution of a scan process or a return process, supply of power supply voltage to the scanner motor 54 may be instantaneously cut off by the interlock switch 30, and the scanner motor 54 may be stepped out and stopped. For instance, in the case where the openable/closable cover 91 is instantaneously opened/closed during a time from periodical detection of an opened/closed state of the openable/closable cover 91 by the open/close detecting portion 13 and detection of an opened/closed state of the openable/closable cover 91 next time, the open/close detecting portion 13 may not properly detect an opened state of the openable/closable cover 91. As a result, a reading interruption process may not be performed because of detection failure of an opened state of the openable/closable cover 91, regardless of interruption of the movement of the carriage 51 by stoppage of the scanner motor 54.

For instance, let it be assumed that a reading interruption process is not executed, regardless that the scanner motor 54 is stopped by instantaneous opening/closing of the openable/closable cover 91 during execution of a scan process. In this case, the scan control portion 12 continues to execute ongoing of the scan process, and thereafter, executes a return process. In this case, however, even if driving of the scanner motor 54 is resumed in the return process, the carriage 51 is moved only by the distance from the position where the carriage 51 is halted to the standby position HP. As a result, in the return process, the moving amount by which the scanner motor 54 moves the carriage 51 in accordance with a driving signal during a period of time from start of output of the driving signal by the scan control portion 12 to detection of the presence of the carriage 51 at the standby position HP by the standby position detection sensor 81 is smaller than the moving amount by which the scanner motor 54 moves the carriage 51 from the reading end position EP to the standby position HP in accordance with a driving signal in a return process which is normally executed in a closed state of the openable/closable cover 91.

On the other hand, let it be assumed that after a scan process has been normally finished, the scanner motor 54 is stopped by instantaneous opening/closing of the openable/closable cover 91 during execution of a return process, but a reading interruption process is not executed. In this case, the scan control portion 12 continues to execute ongoing of the return process. In this case, the scan control portion 12 continues to output a driving signal regardless that the carriage 51 is halted. As a result, the moving amount of the carriage 51 represented by the driving signal outputted from the scan control portion 12 continues to increase in the return process. As a result of the above operation, by the time when driving of the scanner motor 54 is resumed in the return process, and the return process is finished by arrival of the carriage 51 at the standby position HP, the moving amount of the carriage 51 represented by the driving signal outputted from the scan control portion 12 in the return process is larger than the moving amount by which the carriage 51 is moved from the reading end position EP to the standby position HP.

However, in the case where the number of pulses of a driving signal representing a moving amount by which the scanner motor 54 moves the carriage 51 in accordance with the driving signal for a period of time from start of output of the driving signal to detection of the presence of the carriage 51 at the standby position HP in the return process is smaller than the reference pulse number (YES in Step S17), the re-scan execution portion 15 causes the guiding portion 16 to display, on the display portion 71, a screen of prompting the user to input a selection instruction as to whether image reading is to be performed so that the user can select whether a re-scan process is to be executed (in Step S18). The reference pulse number indicates a moving amount by which the scanner motor 54 moves the carriage 51 from the reading end position EP to the standby position HP in accordance with a driving signal in a return process which is normally executed in a closed state of the openable/closable cover 91. Subsequently, in the case where a selection instruction to read a document image is received, the re-scan execution portion 15 executes a re-scan process, in other words, a scan process is executed again (in Step S19).

On the other hand, in the case where the number of pulses of a driving signal outputted from the scanner motor 54 during a period of time from start of output of the driving signal to detection of the presence of the carriage 51 at the standby position HP in the return process is not smaller than the reference pulse number (NO in Step S17), the re-scan execution portion 15 causes the scan control portion 12 to finish the image reading operation, based on a judgment that a scan process has been normally finished.

In the foregoing description, the following advantages are obtained. For instance, as described above, let it be assumed that during execution of a scan process, image reading is interrupted resulting from instantaneous opening/closing of the openable/closable cover 91, and an opened state of the openable/closable cover 91 is not detected. In this case, in a return process, the moving amount by which the scanner motor 54 moves the carriage 51 in accordance with a driving signal during a period of time from start of output of the driving signal to detection of the presence of the carriage 51 at the standby position HP is smaller than the moving amount by which the scanner motor 54 moves the carriage 51 from the reading end position EP to the standby position HP in accordance with the driving signal in a return process which is normally executed in a closed state of the openable/closable cover 91. In this case, the re-scan execution portion 15 is operative to execute a re-scan process. In other words, the above configuration makes it possible to read a document image again, while reducing a user operation of checking whether the document image has been normally read, in the case where the document image reading is interrupted by the operation of the interlock switch 30 without detection an opened state of the openable/closable cover 91.

Further, according to the embodiment, in a return process, the re-scan execution portion 15 can easily grasp the moving amount by which the scanner motor 54 moves the carriage 51 in accordance with a driving signal during a period of time from start of output of the driving signal to detection of the presence of the carriage 51 at the standby position HP, in terms of the number of pulses of the driving signal.

Further, in the case where a voltage to be supplied or cut off to or from the document reading portion 5 and the A/D converter 23 is lower than a predetermined reference voltage by the operation of the interlock switch 30, the open/close detecting portion 13 detects that the openable/closable cover 91 is in an opened state. Accordingly, for instance, in the case where the voltage to be supplied or cut off is lowered by the operation of the interlock switch 30 resulting from e.g. instantaneous power off of a commercial power supply, and the scanner motor 54 is not normally operated, the open/close detecting portion 13 detects that the openable/closable cover 91 is in an opened state. In this case, a reading interruption process is executed by the interruption control portion 14, and the scan process is interrupted. The above configuration is advantageous in reducing a possibility that a scan process is continued in a state that the scanner motor 54 is not properly operated.

The configuration shown in FIG. 1 to FIG. 7 is merely an example of the embodiment of the present disclosure, and the present disclosure is not limited by the embodiment.

(1) In Step S18 and in Step S31, the speaker 73 may output sound for prompting the user to input a selection instruction as to whether image reading is to be performed, in place of causing the display portion 71 to display a screen of prompting the user to input a selection instruction as to whether image reading is to be performed. The sound may be configured such that the user is prompted to press the start key, in the case where image reading is performed, and the user is prompted to press the numeric keypad, in the case where image reading is not performed.

(2) The scanner motor 54 is not limited to a stepping motor, but may be a servo motor or a DC brushless motor. Further, a driving signal to be outputted to the scanner motor 54 by the scan control portion 12 is not limited to a pulse-like signal, but may be a signal indicative of driving or stopping the scanner motor 54 every predetermined time interval. Further, the scanner motor 54 may switch between continuation of driving and stopping of driving in response to an instruction represented by a driving signal to be inputted every predetermined time interval. According to the above modification, the scan control portion 12 can grasp the moving amount of the carriage 51, based on a test value obtained by e.g. test driving. Specifically, the scan control portion 12 can grasp the moving amount of the carriage 51, with use of a predetermined servo control amount, or a change amount of the rotation angle of the scanner motor 54 to be obtained when the scan control portion 12 outputs, to the scanner motor 54, a signal indicative of driving the scanner motor 54 every predetermined time interval.

(3) In the embodiment, the open/close detecting portion 13 detects an opened/closed state of the openable/closable cover 91, based on a voltage value represented by a detection signal outputted from the A/D converter 23. However, the present disclosure is not limited to the above configuration, as far as the open/close detecting portion 13 can detect an opened/closed state of the openable/closable cover 91. For instance, the interlock switch 30 may output detection signals respectively indicative of an on-state and an off-state to the control portion 10. In the above modification, the open/close detecting portion 13 may detect a closed state of the openable/closable cover 91 in the case where a detection signal to be outputted from the interlock switch 30 indicates an on-state, and may detect an opened state of the openable/closable cover 91 in the case where a detection signal to be outputted from the interlock switch 30 indicates an off-state.

(4) Further, in Step S17, in the case where the return pulse number counted by the scan control portion 12 is smaller than the reference pulse number (YES in Step S17), the process of Step S2 and thereafter may be repeated, and Step S18 and Step S19 may be omitted for simplifying the process to be executed by the re-scan execution portion 15. In other words, a re-scan process may be automatically executed for simplifying the process to be executed by the re-scan execution portion 15. Likewise, in Step S30, in the case where it is determined that interruption information is stored in the interruption information storing portion 17 (YES in Step S30), the process of Step S2 and thereafter may be repeated, and Step S31 and Step S32 may be omitted for simplifying the process to be executed by the re-scan execution portion 15. In other words, a re-scan process may be automatically executed for simplifying the process to be executed by the re-scan execution portion 15.

According to the above configuration, it is possible to read a document image again without a user operation, in the case where the openable/closable cover 91 is brought to an opened state during execution of a scan process, and the document image reading is interrupted resulting from cutoff of supply of power supply voltage to the scanner motor 54 by the operation of the interlock switch 30. The above configuration makes it possible to reduce a user operation of reading a document image again, in the case where the document image reading is interrupted by the operation of the interlock mechanism.

(5) Further, the image reading operation may be finished by finishing the return process in Step S15, without performing Step S12, and Step S16 to Step S19. This is advantageous in simplifying the process of the image reading operation.

Further, an image forming apparatus according to the present disclosure may be an image forming apparatus such as a scanner device and a copying machine, in addition to the complex machine 1 as described above.

According to the present disclosure as described above, it is possible to reduce a user operation of reading a document image again, in the case where the document image reading is interrupted by the operation of the interlock mechanism.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An image reading device, comprising:
an apparatus body;
a document setting portion configured to place a document thereon;
a reading portion configured to read an image of the document placed on the document setting portion;
a driving portion configured to move the reading portion along a sub-scan direction between a first position and a second position;
a position detecting portion configured to detect whether the reading portion is present in the first position;
a power supply portion configured to generate a power supply voltage for operating the driving portion;
a cover configured to be mounted on the apparatus body to be openable and closable;
an interlock portion configured to supply the power supply voltage from the power supply portion to the driving portion in the case where the cover is in a closed state, and cut off supply of the power supply voltage from the power supply portion to the driving portion in the case where the cover is in an opened state, in association with the opened/closed state of the cover;
an open/close detecting portion configured to detect the opened/closed state of the cover; and
a control portion configured to:
execute a scan process of causing the reading portion to read the document image during movement of the reading portion from the first position to the second position in a first direction along the sub-scan direction;
execute a return process of returning the reading portion to the first position by moving the reading portion in a second direction opposite to the first direction;
execute a reading interruption process of stopping ongoing of the scan process when the open/close detecting portion detects that the cover is in an opened state during execution of the scan process, and executing the return process when the open/close detecting portion detects that the cover is in a closed state next time; and
execute a re-scan process of executing the scan process again after completion of the reading interruption process, wherein
the control portion causes the driving portion to move the reading portion by outputting an instruction signal to cause the driving portion to move the reading portion,
the driving portion causes the reading portion to move in accordance with the instruction signal outputted from the control portion, and
the control portion further executes the re-scan process, in the case where a moving amount by which the driving portion moves the reading portion in accordance with the instruction signal during a time from start of output of the instruction signal for the return process to detection of a presence of the reading portion in the first position by the position detecting portion is smaller than a predetermined reference value, in the case where the position detecting portion detects the presence of the reading portion in the first position in the return process.

2. The image reading device according to claim 1, wherein the instruction signal is a pulse signal, and
the driving portion is a stepping motor, the driving portion being configured to move the reading portion by a moving amount represented by the number of pulses of the pulse signal.

3. The image reading device according to claim 1, wherein the open/close detecting portion monitors a voltage to be obtained by the supply or the cutoff by the interlock portion, detects that the cover is in an opened state when the monitored voltage is lower than a predetermined reference voltage, and detects that the cover is in a closed state when the monitored voltage is not lower than the predetermined reference voltage.

4. The image reading device according to claim 1, further comprising:
a guiding portion configured to prompt a user to input a selection instruction as to whether the image reading is to be performed; and
a receiving portion configured to receive the input of the selection instruction, wherein
the control portion causes the guiding portion to prompt the user to input the selection instruction prior to execution of the re-scan process, and executes the re-scan process in the case where the selection instruction to read the document image is received by the receiving portion.

5. An image forming apparatus, comprising:
the image reading device of claim 1; and
an image forming portion configured to form the document image read by the reading portion on a sheet.

6. An image reading device, comprising:
an apparatus body;
a document setting portion configured to place a document thereon;
a reading portion configured to read an image of the document placed on the document setting portion;
a driving portion configured to move the reading portion along a sub-scan direction;
a power supply portion configured to generate a power supply voltage for operating the driving portion;
a cover configured to be mounted on the apparatus body to be openable and closable;
an interlock portion configured to supply the power supply voltage from the power supply portion to the driving portion in the case where the cover is in a closed state, and cut off supply of the power supply voltage from the power supply portion to the driving portion in the case where the cover is in an opened state, in association with the opened/closed state of the cover;
an open/close detecting portion configured to detect the opened/closed state of the cover;
a guiding portion configured to prompt a user to input a selection instruction as to whether the image reading is to be performed;
a receiving portion configured to receive the input of the selection instruction, and
a control portion configured to:
execute a scan process of causing the reading portion to read the document image during movement of the reading portion from a first position to a second position in a first direction along the sub-scan direction;
execute a return process of returning the reading portion to the first position by moving the reading portion in a second direction opposite to the first direction;
execute a reading interruption process of stopping ongoing of the scan process when the open/close detecting portion detects that the cover is in an opened state during execution of the scan process, and executing the return process when the open/close detecting portion detects that the cover is in a closed state next time;
execute a re-scan process of executing the scan process again after completion of the reading interruption process; and cause the guiding portion to prompt the user to input the selection instruction prior to execution of the re-scan process, and executes the re-scan process in the case where the selection instruction to read the document image is received by the receiving portion.

* * * * *